Feb. 18, 1930.  G. FORNACA  1,747,166

MOTOR VEHICLE

Filed Sept. 20, 1926   2 Sheets-Sheet 1

Inventor
Guido Fornaca,
By Henry Ortiz Jr
 atty

Feb. 18, 1930.  G. FORNACA  1,747,166
MOTOR VEHICLE
Filed Sept. 20, 1926  2 Sheets-Sheet 2

Inventor
Guido Fornaca
By Henry Orth Jr.
Atty.

Patented Feb. 18, 1930

1,747,166

UNITED STATES PATENT OFFICE

GUIDO FORNACA, OF TURIN, ITALY; LUIGI FORNACA EXECUTOR OF SAID GUIDO FORNACA, DECEASED, ASSIGNOR TO FIAT SOCIETA ANONIMA, OF TURIN, ITALY

MOTOR VEHICLE

Application filed September 20, 1926, Serial No. 136,591, and in Italy September 28, 1925.

Motor vehicles having two pairs of driving wheels are generally steered through the fore wheels, as is done in ordinary motor vehicles in which only the rear wheels are driving wheels.

Such a system is inconvenient in that in turning a curve the middle trajectory of the fore wheels does not coincide with the middle trajectory of the back wheels, so that, besides the differential gears required on each side to compensate the difference of speed between the right and left wheels, it is necessary to insert a third differential gear between the axle driving shafts, thus rendering the construction very complicated.

If, however, the four wheels are simultaneously steered in such manner that the average speed of the fore wheels will at any time be equal to the average speed of the rear wheels, the third differential gear can be eliminated.

For this purpose, it will be sufficient if at any time while the vehicle is describing a curve, the extensions of the axes of all four wheels meet on the middle line perpendicular to the segment connecting the centres of the two axles, thus ensuring that the back wheels will follow in the same track as the fore wheels when the vehicle is turning.

My present invention provides a motor vehicle with two pairs of driving and steering wheels, each pair supporting a separate frame, characterized by a transmission mechanism so constructed and arranged as to correctly drive all four wheels using only two differential gears and to permit correct turning of the vehicle even when the radius of curvature is very small.

A constructional form of the vehicle is illustrated, by way of example, on the accompanying drawings.

Figure 1:
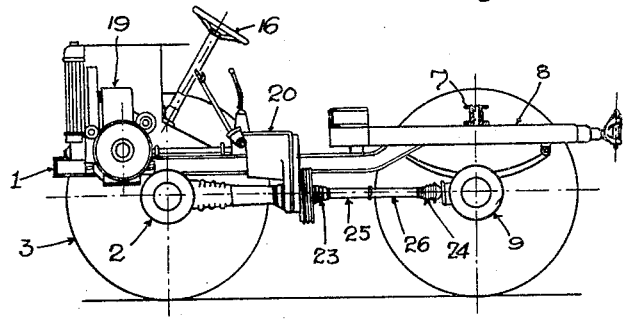
Fig. 1 is a side elevation, partly in section.
Figure 2:
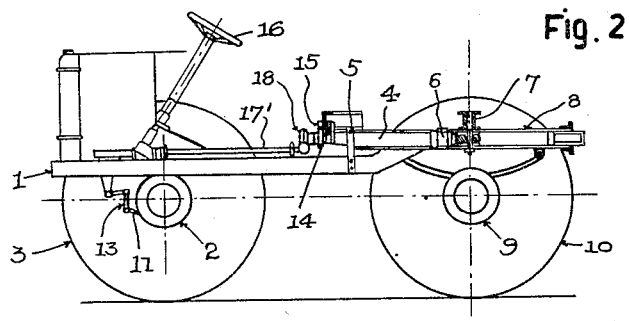
Fig. 2 is a similar view but without the engine and the power transmission members.

Referring to the drawings, 1 denotes the front frame resting on the front axle 2 provided with driving and steering wheels 3. Said frame has bearings 5 and 6 in which is mounted a cylindrical extension 4 constituting an intermediate member provided with a socket for a pin 7 on the rear frame 8 that is supported by the rear axle 9 and rear wheels 10. The frame 8, with the rear axle and rear wheels is rotatable on the pin 7 (the extended axis of which passes through the centre of the rear axle 9) by means of a pinion 14 coaxial with the extension 4 and meshing with a toothed sector 15 on the fore part of said rear frame, the arc of curvature of the sector having its centre in the axis of said pin 7.

Figure 4:
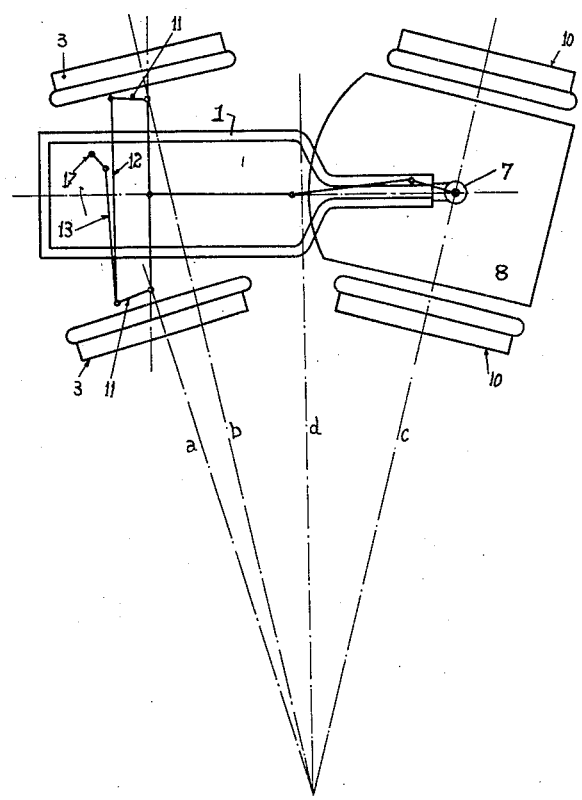
Fig. 4 is a diagrammatic plan showing the steering mechanism.

Steering of the fore wheels is effected in the usual manner by means of the levers 11 connected with the wheel swivels 21, 22, a coupling rod 12 and a rod 13 effecting their displacement (Fig. 4).

Figure 5:
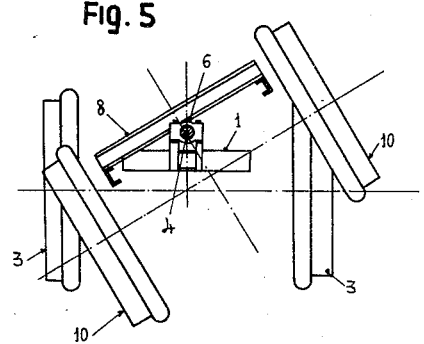
Fig. 5 is a diagrammatic rear view.

To enable the vehicle to run on uneven roads the member 4 is made rotatable within the bearings 5 and 6, so that the two frames can oscillate according to the inclination required by the unevenness of the road (Fig. 5) independently of one another.

Simultaneous steering of both frames is obtained from a single steering wheel 16 which, by means of two transmission shafts, 17 17' connected respectively with the rod 13 for the front wheels, and the gearing 18 which includes the pinion 14 with the necessary gear ratio for constantly ensuring the convergency of the wheel axes $a$, $b$, $c$ with respect to the straight line $d$.

When the vehicle has to run on roads with turns of a sufficiently ample radius as is the case on ordinary roads, the steering for the rear axle 9 may be rendered inoperative by providing a clutch (not shown) between the steering wheel 16 and the pinion 14. In this case the steering action of the fore wheels is sufficient, the centres of the two axles undergoing an equal displacement.

It is advantageous to eliminate steering of the rear wheels whenever this is possible because a greater driving stability is thereby conferred to the vehicle which then runs like a single frame vehicle. Stability is, of course, all the more necessary when the vehicle is running at a high speed as is the case on ordinary roads with large curves.

Figure 3:
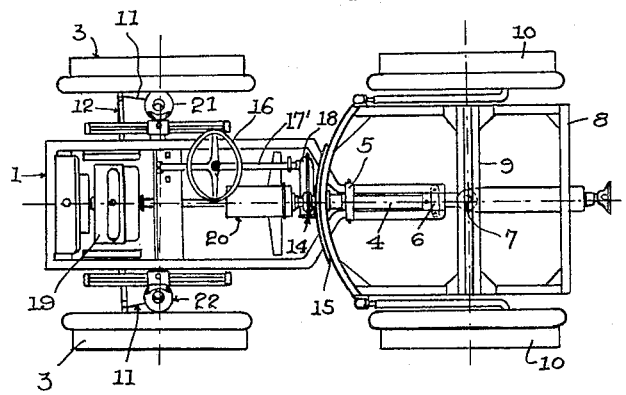
Fig. 3 is a plan corresponding to Fig. 1.

The transmission of power to all four wheels is effected in the following manner (Figs. 1 and 3):—

The engine 19 actuates change speed gearing 20 mounted on the main frame 1 and hence the axles 2 and 9 that, in their turn, drive the fore and rear wheels respectively. To ensure the steering of the rear wheels, the power transmission from the change speed gearing to the axle 9 is effected through two cardan joints 23, 24 and a shaft 25 (Fig. 1) displaceable axially in a sleeve 26. This arrangement allows free rotation of the frame 8 on the tube 4 when required by the unevenness of the road.

What I claim is:

In a motor vehicle, the combination of a front frame, a supporting axle in fixed relation thereto, steering wheels swiveled on the axle, steering mechanism for swinging the wheels in angular relation to the frame, a rear frame, supporting wheels for the latter mounted to rotate on an axle in fixed relation to the rear frame, a vertical pivot pin on the rear frame having its axis extending through the center of the rear axle, a rear extension member rotatively mounted in the front frame, and having its rear end pivoted on said pin, a toothed sector on the rear frame concentric to said pin, a pinion mounted on the front frame co-axial with the rear extension member in mesh with said sector, and mechanism on the front frame operatively connected with said steering mechanism for rotating said pinion whereby the rear frame is moved in angular relation to the front frame simultaneously with the swinging of the front wheels.

In testimony that I claim the foregoing as my invention I have signed my name.

GUIDO FORNACA